US009352477B1

(12) United States Patent
Warnick et al.

(10) Patent No.: US 9,352,477 B1
(45) Date of Patent: May 31, 2016

(54) CAKE CUTTER AND SERVER APPARATUS, SYSTEM, AND METHOD

(71) Applicants: Joshua James Warnick, Greenwood, IN (US); Donald Randolph Byrd, Indianapolis, IN (US)

(72) Inventors: Joshua James Warnick, Greenwood, IN (US); Donald Randolph Byrd, Indianapolis, IN (US)

(73) Assignee: DJBW, LLC, Indianapolis, IN (US)

( * ) Notice: Subject to any disclaimer, the term of this patent is extended or adjusted under 35 U.S.C. 154(b) by 0 days.

(21) Appl. No.: 14/696,415

(22) Filed: Apr. 25, 2015

(51) Int. Cl.

| | |
|---|---|
| ***B26B 27/00*** | (2006.01) |
| ***B26D 3/24*** | (2006.01) |
| ***A47G 21/04*** | (2006.01) |
| ***A21D 13/08*** | (2006.01) |

(52) U.S. Cl.
CPC .............. *B26B 27/002* (2013.01); *A21D 13/08* (2013.01); *A47G 21/045* (2013.01); *B26D 3/24* (2013.01)

(58) Field of Classification Search
CPC .............................. B26B 27/002; A01B 1/022
USPC ......................... 83/651.1; 30/117; 7/113, 158
See application file for complete search history.

(56) References Cited

U.S. PATENT DOCUMENTS

| | | | | | |
|---|---|---|---|---|---|
| 316,759 | A * | 4/1885 | Dexter | B06B 27/002 | 30/116 |
| 1,027,020 | A * | 5/1912 | Waters | B26B 27/002 | 30/117 |
| 1,111,373 | A * | 9/1914 | Givulinovich | B26D 1/30 | 30/117 |
| 1,596,404 | A * | 8/1926 | Clouser | E04B 1/4185 | 52/474 |
| 1,653,578 | A * | 12/1927 | Larsen | B26D 1/553 | 30/117 |
| 1,714,494 | A * | 5/1929 | Case | A01J 23/00 | 30/117 |
| 1,714,495 | A * | 5/1929 | Case | A01J 23/00 | 30/117 |
| 2,051,426 | A * | 8/1936 | Schneider | B26B 27/00 | 30/116 |
| 2,158,667 | A * | 5/1939 | Rieck | B26D 1/553 | 206/216 |
| 2,405,311 | A * | 8/1946 | Livadas | B26B 27/002 | 30/117 |
| 4,195,402 | A * | 4/1980 | Leffer | B26D 1/547 | 30/114 |
| 4,213,241 | A * | 7/1980 | Haapala | B26B 27/002 | 30/115 |
| 5,153,993 | A * | 10/1992 | Whisnant | A21C 5/00 | 30/116 |

* cited by examiner

*Primary Examiner* — Kenneth E Peterson
(74) *Attorney, Agent, or Firm* — Woodard Emhardt Moriarty McNett & Henry LLP

(57) ABSTRACT

Disclosed in various example embodiments is a cake cutter and server apparatus, system, and methods of use adapted to neatly cut differently-shaped cakes into regularly-sized slices and serve them without ruining the appearance of the cake or making a mess. Provided in various example embodiments are first and second longitudinally-extending members connected with a plurality of spaced-apart flexible lines that may be coiled around one or more of the members prior to use. One or more of the longitudinally-extending members may be readily disassembled and a portion thereof converted into a handle of a server that may be provided therewith in a kit that can be inexpensively manufactured, is compact, easy-to-use, and could be provided within typical cake boxes.

4 Claims, 8 Drawing Sheets

CAKE CUTTER AND SERVER APPARATUS, SYSTEM, AND METHOD

CROSS-REFERENCE TO RELATED APPLICATIONS

None.

FEDERALLY SPONSORED RESEARCH OR DEVELOPMENT

None.

TECHNICAL FIELD

The invention relates generally to a cake cutter and server apparatus, system, and method of use that may be compactly and inexpensively packaged with a cake box, and conveniently employed for neatly cutting square, rectangular, and round cakes into portions or slices of approximately equal size, and then converted into a cake server to easily serve the slices.

BACKGROUND

Cutting and serving a cake is usually a messy affair, requiring utensils such as a long knife and separate spatula-type server that typically ruin the appearance of the cake when it is cut into pieces. Normal cake cutting also typically creates irregular and inconsistently-sized pieces and leaves behind a trail of frosting and cake bits. Additionally, cakes are often presented and consumed at locations away from fully-stocked kitchens, many times leaving the server with nothing but inadequate plastic knives or forks or the like with which to cut and serve the cake. What is needed is an inexpensive, compact, and easy-to-use cutting and serving system that could be provided with typical cake boxes, and which neatly cuts differently-shaped cakes into regularly-sized slices without ruining the appearance of the cake or making a mess.

SUMMARY

The present invention provides an elegant solution to the needs described herein and provides numerous additional benefits and advantages as will be apparent to persons of skill in the art. The present cake cutter and server apparatus, system, and method of use may in various example embodiments comprise a cutter system capable of cutting a pastry into pieces without substantially disturbing the exterior appearance of the pastry, comprising: a first longitudinally-extending member extending from a first end to a second end; a second longitudinally-extending member extending from a first end to a second end and having a body that is at least partially hollow and open on the second end, the second longitudinally-extending member comprising a longitudinally-extending slot forming a longitudinally-extending opening from an interior surface to an exterior surface of the second longitudinally-extending member and extending to the second end of the second longitudinally-extending member, the second longitudinally-extending member further comprising an attachment structure formed on the first end or second end of the second longitudinally-extending member; a third longitudinally-extending member extending from a first end to a second end and removably affixed with the second longitudinally-extending member and inserted at least partially inside the hollow body of the second longitudinally-extending member; and a plurality of spaced-apart flexible material lines, with a first end of each of said flexible material lines connected to the first longitudinally-extending member and a second end of each of said flexible material lines connected to the third longitudinally-extending member so that a plurality of the flexible material lines pass through the longitudinally-extending slot in the second longitudinally-extending member.

In various example embodiments the cutter system may further comprise: a server blade structure comprising: a blade shaped and sized to balance a serving of pastry; and an attachment structure configured to rigidly attach with the attachment structure formed on the first end or second end of the second longitudinally-extending member, so that the second longitudinally-extending member becomes a server blade handle when separated from the third longitudinally-extending member and attached to the attachment structure of the server blade. Various example embodiments may further comprise a package containing and at least partially enclosing the cutter system. Various example embodiments may further comprise a container containing a pastry and the package. In various example embodiments the plurality of spaced-apart flexible material lines are equal-spaced.

Also provided in various example embodiments is a method of cutting a pastry having a thickness, comprising the steps of: providing a cutter system capable of cutting a pastry into pieces without substantially disturbing the exterior appearance of the pastry, the cutter system comprising: a first longitudinally-extending member extending from a first end to a second end; a second longitudinally-extending member extending from a first end to a second end and having a body that is at least partially hollow and open on the second end, the second longitudinally-extending member comprising a longitudinally-extending slot forming a longitudinally-extending opening from an interior surface to an exterior surface of the second longitudinally-extending member and extending to the second end of the second longitudinally-extending member, the second longitudinally-extending member further comprising an attachment structure formed on the first end or second end of the second longitudinally-extending member; a third longitudinally-extending member extending from a first end to a second end and removably affixed with the second longitudinally-extending member and inserted at least partially inside the hollow body of the second longitudinally-extending member; a plurality of spaced-apart flexible material lines, with a first end of each of said flexible material lines connected to the first longitudinally-extending member and a second end of each of said flexible material lines connected to the third longitudinally-extending member so that a plurality of the flexible material lines pass through the longitudinally-extending slot in the second longitudinally-extending member; the method further comprising the steps of urging the first longitudinally-extending member away from the second longitudinally-extending member until the plurality of equal-spaced flexible material lines are taut and the first longitudinally-extending member is separated from the second longitudinally-extending member by a distance equal to or greater than an outer dimension of the pastry; positioning the cutter system above the pastry in a first position; moving the cutter system downward against the pastry so that at least two of the plurality of flexible material lines form corresponding first cuts at least substantially all the way through the thickness of the pastry.

In various example embodiments the method may further comprise the steps of: lifting the cutter system up above the pastry so that the flexible material lines lift back up through and above the corresponding first cuts in the pastry; positioning the cutter system above the pastry in a second position;

and moving the cutter system downward against the pastry so that at least two of the plurality of equal-spaced flexible material lines form corresponding second cuts at least substantially all the way through the thickness of the pastry. In various example embodiments the second position is approximately perpendicular to the first position, and the second cuts are approximately perpendicular to the first cuts. In various example embodiments the second position is approximately parallel to the first position, and the second cuts are approximately parallel to the first cuts.

In various example embodiments the method may further comprise the steps of: cutting the pastry into wedge-shaped pieces by rotating the first longitudinally-extending member approximately 180 degrees relative to the second longitudinally-extending member about an axis approximately perpendicular to longitudinal axes of the first and second longitudinally-extending members, prior to moving the cutter system downward against the pastry. In various example embodiments the method may further comprise the steps of: lifting the cutter system up above the pastry so that the flexible material lines lift back up through and above the corresponding first cuts in the pastry; positioning the cutter system above the pastry in a second position; and moving the cutter system downward against the pastry so that at least two of the plurality of flexible material lines form corresponding second cuts at least substantially all the way through the thickness of the pastry. In various example embodiments the second position is rotated relative to the first position about the approximate center of the cutter system, and the second cuts are rotated relative to the first cuts.

In various example embodiments the method may further comprise the steps of: providing a cutter system further comprising: a server blade structure comprising: a blade shaped and sized to balance a serving of pastry; and an attachment structure configured to rigidly attach with the attachment structure formed on the first end or second end of the second longitudinally-extending member, so that the second longitudinally-extending member becomes a server blade handle when separated from the third longitudinally-extending member and attached to the attachment structure of the server blade; the method further comprising the steps of separating the second longitudinally-extending member from the third longitudinally-extending member; and attaching the attachment structure formed on the first end or second end of the second longitudinally-extending member to the attachment structure of the server blade.

In various example embodiments the method may further comprise the steps of: sliding the blade under a cut piece of the pastry while holding the second longitudinally-extending member as a handle; lifting-up the cut piece of the pastry with the blade and removing it from the pastry. In various example embodiments the method may further comprise the steps of: serving the cut piece of pastry by sliding the cut piece of pastry from the blade to a plate while holding the second longitudinally-extending member as a handle. In various example embodiments the method may further comprise the steps of: recycling the cutter system.

In various example embodiments the method may further comprise the steps of: removing the cutter system from a package attached to a container for the pastry. In various example embodiments the method may further comprise the steps of: removing the cutter system from a package enclosed within a container for the pastry.

The foregoing summary is illustrative only and is not meant to be exhaustive. Other aspects, objects, and advantages of this invention will be apparent to those of skill in the art upon reviewing the drawings, the disclosure, and the appended claims.

BRIEF DESCRIPTION OF THE DRAWINGS

The following example figures are provided to illustrate example embodiments, and do not limit the scope of the invention, which is defined solely by the appended claims.

DETAILED DESCRIPTION OF EXAMPLE EMBODIMENTS

Reference will now be made in detail to some specific examples of the invention, including any best mode contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these features or specific details. In other instances, components and process operations well known to persons of skill in the art have not been described in detail in order not to obscure unnecessarily the present invention.

Various techniques and mechanisms of the present invention will sometimes be described in singular form for clarity. However, it should be noted that some embodiments may include multiple iterations of a technique or multiple components, mechanisms, and the like, unless noted otherwise. Similarly, various steps of the methods shown and described herein are not necessarily performed in the order indicated, or performed at all in certain embodiments. Accordingly, some implementations of the methods discussed herein may include more or fewer steps than those shown or described.

Further, the techniques and mechanisms of the present invention will sometimes describe a connection, relationship or communication between two or more items or entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

Figure 1:
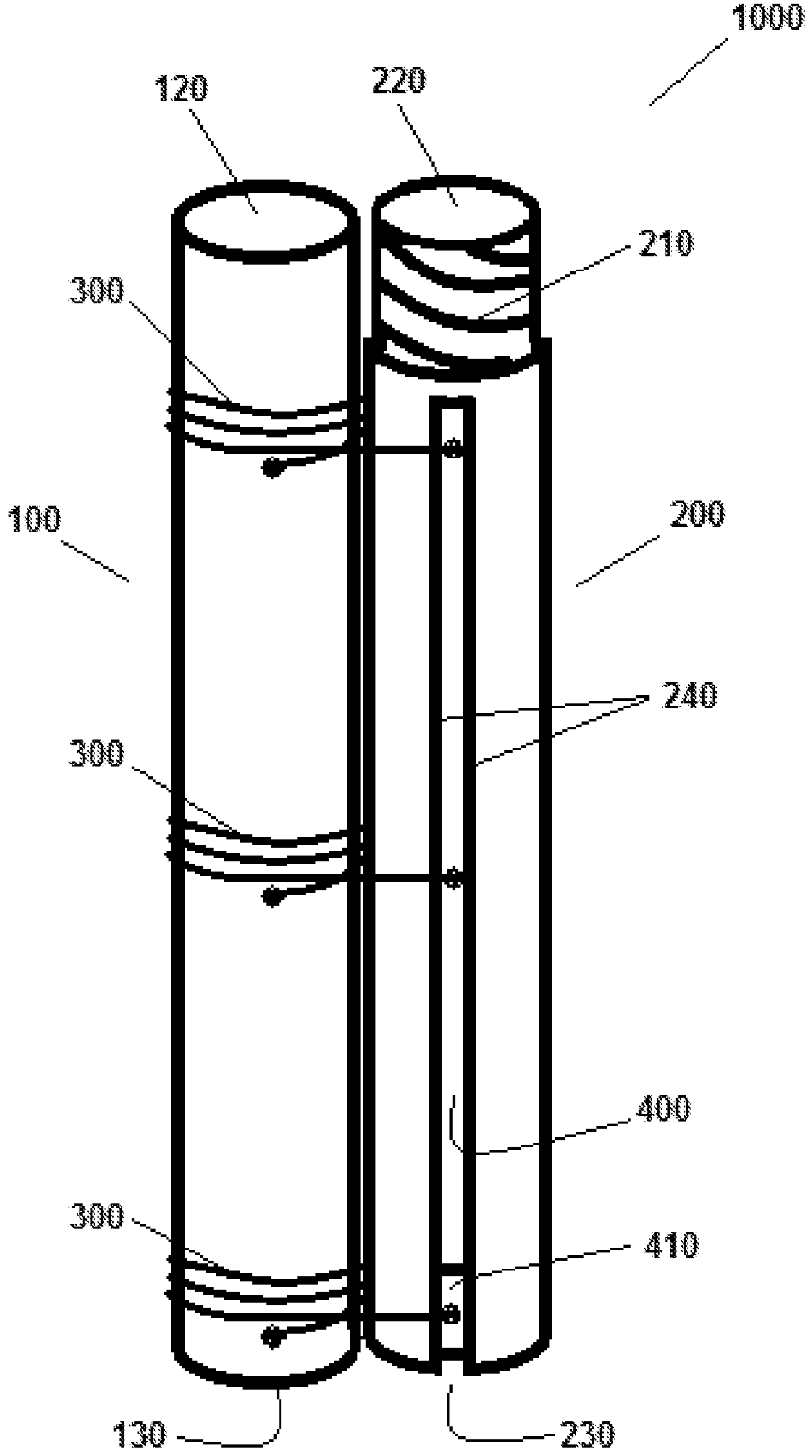
FIG. 1 is a front elevation perspective view of an example cake cutter apparatus and system according to various example embodiments, shown in a retracted position, and not necessarily to scale.
Figure 2:
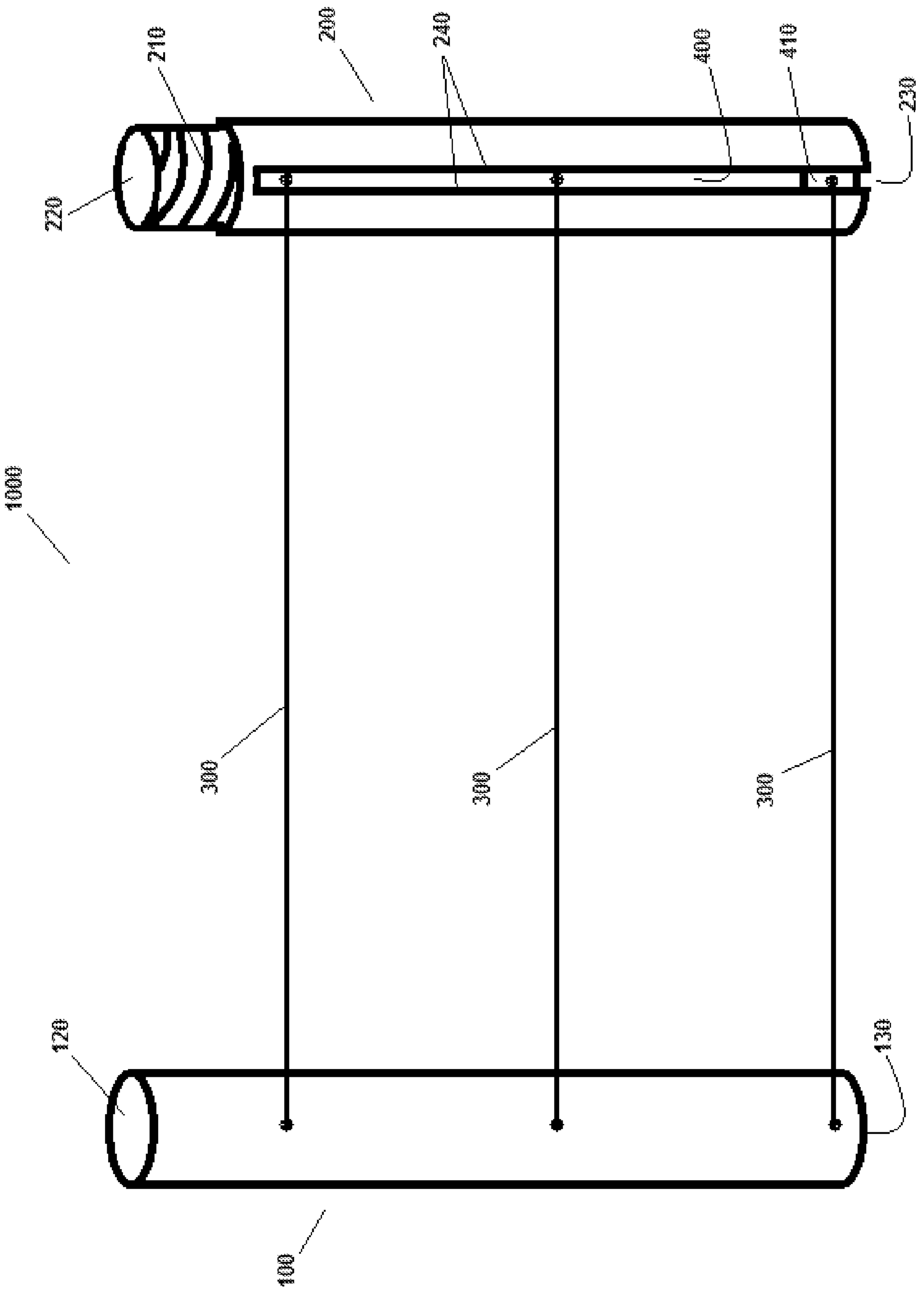
FIG. 2 is a front elevation perspective view of the example cake cutter apparatus and system of FIG. 1, shown in an expanded position, and not necessarily to scale.

Various aspects of example embodiments of certain apparatus, systems, and methods will now be described with reference to FIGS. 1 through 8B. Turning first to FIGS. 1 and 2, shown is an example cake cutter apparatus and cutter system 1000 according to various example embodiments. Provided in various example embodiments is a first member 100 extending longitudinally from a first end 120 to a second end 130. First member 100 may comprise a dowel, for example, round in cross-section, or may be any other suitable longitudinally-extending shape. In various example embodiments first member 100 may extend longitudinally several inches, for instance six, eight, ten, or twelve inches, or any other length suitable for a user to handle as described herein. In various example embodiments first member 100 may have a cross-sectional width, for instance a diameter, suitable for a user to handle as described herein and sufficient to provide the strength needed for use as described herein. For example and not by way of limitation, first member 100 may have a cross-sectional width, for instance a diameter, of approximately one-quarter inch, three-eighths inch, one-half inch, or any other suitable width or diameter. First member 100 may be formed from any suitable material(s), such as wood, plastic, glass, metal, composite material, or any other suitable material or any combination(s) thereof. For example, first member 100 may be formed from cottonwood, birch, spruce, or bamboo, for example. Alternatively, first member 100 may be formed from plastic, for example, such as a dishwasher-safe, FDA-approved thermoplastic (e.g. Acrylonitrile Butadiene Styrene (ABS)), Nylon, or glass fill.

With continued reference to the example embodiment shown in FIGS. 1 and 2, provided in various example embodiments is a second member 200 extending longitudinally from a first end 220 to a second end 230. Second member 200 may comprise an at least partially hollow dowel, for example, round in outer cross-section, or may be any other suitable longitudinally-extending shape. In various example embodiments second member 200 may extend longitudinally several inches, for instance six, eight, ten, or twelve inches, or any other length suitable for a user to handle as described herein. In various example embodiments second member 200 may be the same or similar length as first member 100. In various example embodiments second member 200 may have a cross-sectional width, for instance a diameter, suitable for a user to handle as described herein and sufficient to provide the strength needed for use as described herein. For example and not by way of limitation, second member 200 may have a cross-sectional width, for instance a diameter, of approximately one-quarter inch, three-eighths inch, one-half inch, or any other suitable width or diameter. In various example embodiments second member 200 may be the same or similar in cross-sectional width or diameter as first member 100. Second member 200 may be formed from any suitable material(s), such as wood, plastic, glass, metal, composite material, or any other suitable material or any combination(s) thereof. For example, second member 200 may be formed from cottonwood, birch, spruce, or bamboo, for example. Alternatively, second member 200 may be formed from plastic, for example, such as a dishwasher-safe, FDA-approved thermoplastic (e.g. Acrylonitrile Butadiene Styrene (ABS)), Nylon, or glass fill. In various example embodiments second member 200 may be formed from the same materials) as first member 100.

Figure 4:
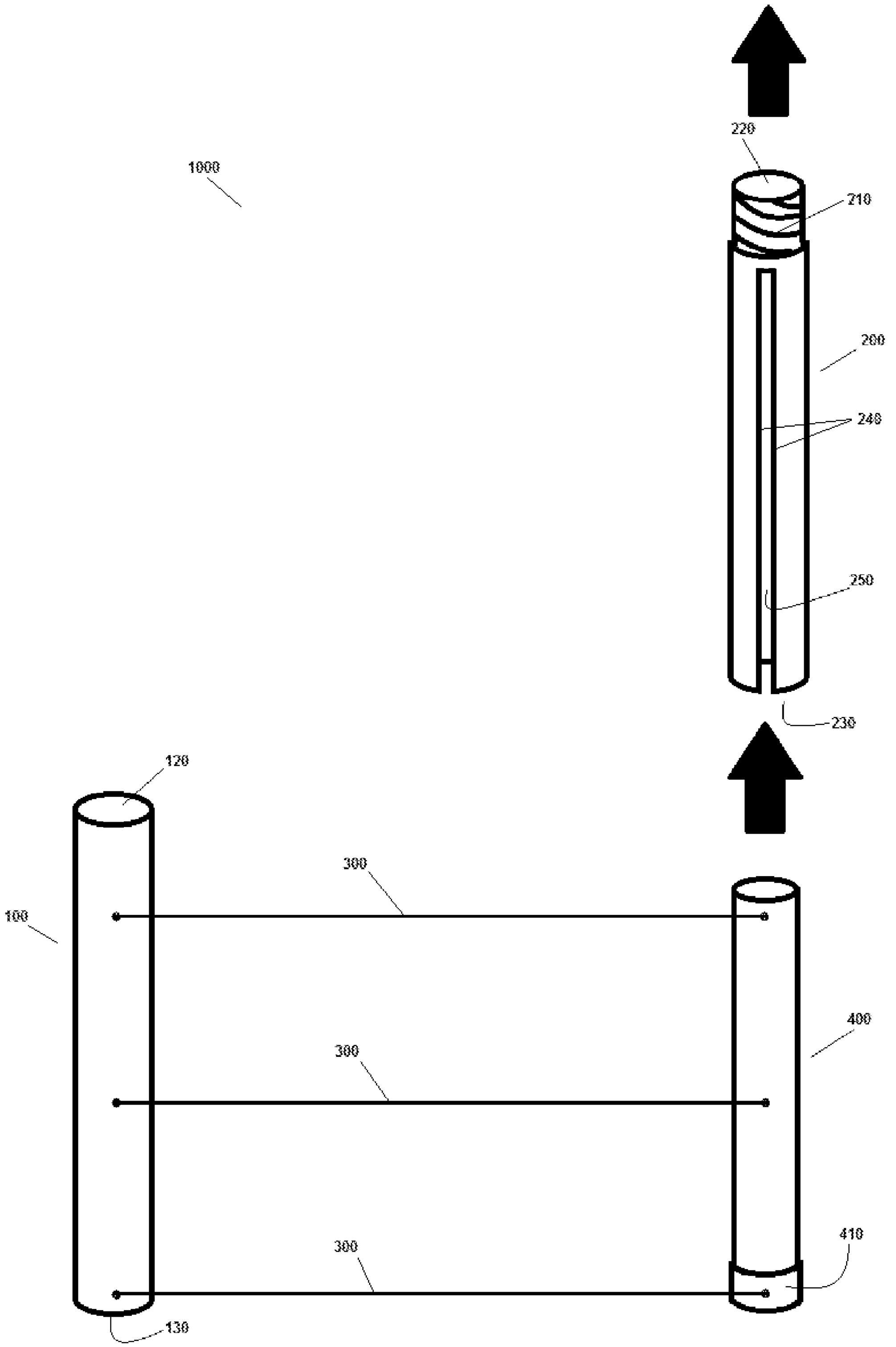
FIG. 4 is a front elevation perspective view of the example cake cutter apparatus and system of FIG. 2 in an expanded position and showing removal of the server handle portion, not necessarily to scale.
Figure 5A:
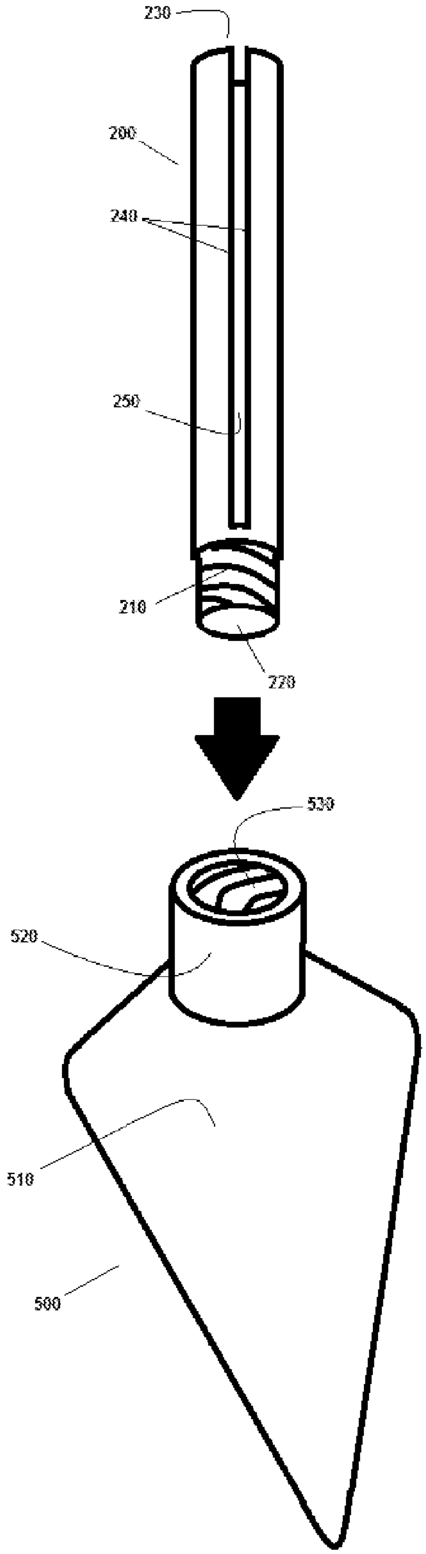
FIG. 5A is a front elevation perspective view of a cake server portion of an example cake cutter and server apparatus and system according to various example embodiments, shown unassembled, and not necessarily to scale.
Figure 5B:
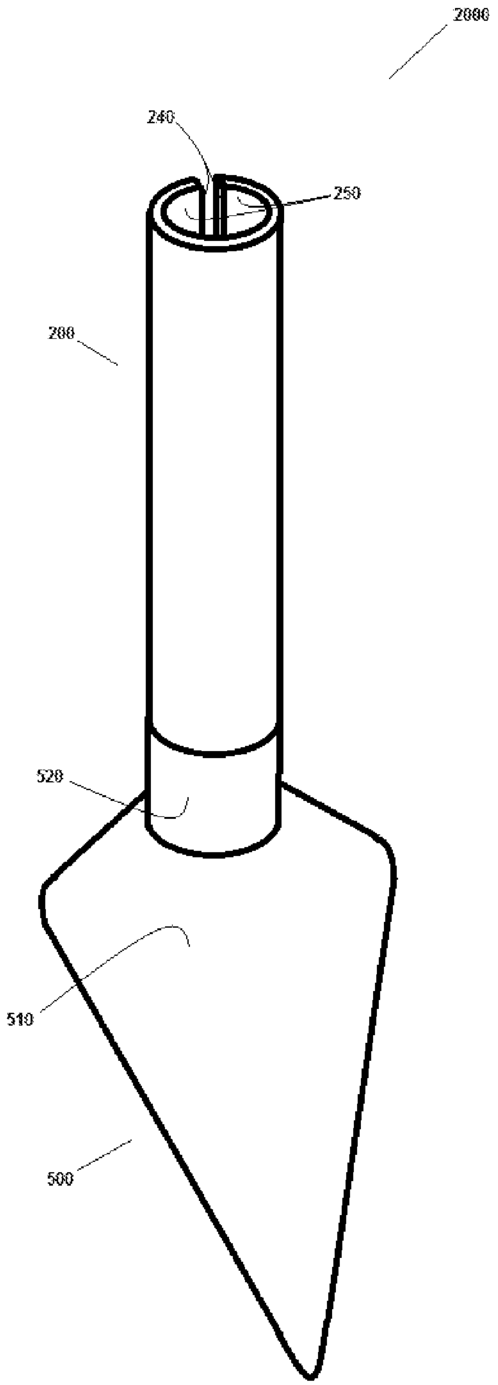
FIG. 5B is a front elevation perspective view of the cake server portion of an example cake cutter and server apparatus and system of FIG. 5A, shown assembled, and not necessarily to scale.

In various example embodiments, second member 200 may be provided with additional features that might or might not be present on first member 100. For instance, as shown in FIGS. 1-4, second member 200 may be at least partially hollow and open on one end or side, e.g., second end 230, and comprise an interior surface 250 (FIGS. 4, 5B). Second member 200 may further comprise a longitudinally-extending slot defined by sides 240 extending from the exterior of the second member 200 to the interior 250 (FIGS. 4, 5A). Longitudinally-extending slot 240 may extend the full length of second member 200 and open up on the first and second ends 220, 230, or the slot 240 may extend part of the length of second member 200 as shown in the figures (where the slot 240 extends all the way to, and opens up to, the second end 230). In various example embodiments the slot 240 is wide enough for the flexible material lines 300, discussed below, to pass through.

Second member 200 may further be provided with attachment structure 210 on or near one end, such as the first end 220. Attachment structure 210 may be provided on or with second member 200 to attach second member 200 to other piece(s) 500 to form a server structure 2000, discussed below (FIGS. 5A, 5B). For example and not by way of limitation, attachment structure 210 may comprise screw threads, such as male screw threads, as depicted in the example embodiments in the figures. Alternatively, any other attachment structure 210 capable of attaching second member 200 to other piece(s) 500 to form a server structure 2000 may be used, such as a tapered plug, ribbed protrusion, tines, detents, set screw, snap-together or interference fit, or any other suitable structure, such as a snap-fit into a groove. Preferably a structure 210 is selected that allows a user to readily attach second member 200 with other piece(s) 500 to form a server structure 2000 by hand without the use of tools.

With specific reference to FIG. 4 in addition to the other figures, provided in various example embodiments is a third longitudinally-extending member 400. Third member 400 may comprise a dowel, for example, round in cross-section, or may be any other suitable longitudinally-extending shape. In various example embodiments third member 400 is sized and shaped to slide into and out of the open second end 230 of the second member 200 to be at least partially or completely placed within the interior of second member 200. Third member 400 may be provided with an engagement mechanism 410 that is configured to removably engage the interior surface 250 of the second member 200 when the third member 400 is inserted at least partially into the interior of the second member 200, to hold the third member 400 in place with respect to the second member 200 during use as described herein. For example and not by way of limitation, engagement mechanism 410 may be a round cross-sectional shape that is slightly larger than a corresponding round interior surface 250 of the second member 200, such that insertion of the third member 400 at least partially into the interior of the second member 200 causes an interference fit between engagement mechanism 410 and interior surface 250. In that example embodiment, the slot 240 may deflect open slightly when engagement mechanism 410 is pushed into and against interior surface 250, thus causing the body of second member 200 to clamp against third member 400 with essentially a radially-inward resiliency or spring force.

In various example embodiments third member 400 may extend longitudinally several inches, for instance six, eight, ten, or twelve inches, or any other length suitable for use in conjunction with the first and second members 100, 200, as described herein. In various example embodiments third member 400 may be at least a substantial portion of the length of first member 100, such as 70%, 75%, 80%, 85%, 90%, 95%, or 100% of the length of first member 100, for example. In various example embodiments third member 400 may have a cross-sectional width, for instance a diameter, suitable to be inserted into second member 200 as described herein and shown in the figures, while providing the strength needed for use as described herein. For example and not by way of limitation, third member 400 may have a cross-sectional width, for instance a diameter, of approximately one-eighth inch, one-quarter inch, three-eighths inch, one-half inch, or any other suitable width or diameter. Third member 400 may be formed from any suitable material(s), such as wood, plastic, glass, composite material, metal, such as stainless steel, or any other suitable material or any combination(s) thereof. For example, third member 400 may be formed from cottonwood, birch, spruce, or bamboo, for example. Alternatively, third member 400 may be formed from plastic, for example, such as a dishwasher-safe, FDA-approved thermoplastic (e.g. Acrylonitrile Butadiene Styrene (ABS)), Nylon, or glass fill. In various example embodiments third member 400 may be formed from the same material(s) as first member 100 or second member 200 or both.

With reference to FIGS. 1-4 and 6-8B, first member 100 may be connected with second longitudinally-extending member 200 by a plurality of spaced-apart lengths of flexible material lines 300, each of which may have a first end connected to first member 100 and a second end connected to third member 400 (which in various example embodiments may be inserted at least partially inside the interior of second member 200, thus connecting first and second members 100, 200 via flexible material lines 300). Flexible material lines 300 may comprise any suitable material or structure, such as strings, wires, cords, filaments, or the like. In various example embodiments, flexible material lines 300 are thin enough in cross-section yet strong enough to readily slice through a typical cake or other pastry or similar food 700, 800 when stretched taut and pushed down with the force of a typical user's hands against the cake or other pastry or similar food item, for instance as depicted by the arrows in FIGS. 7A through 8B. For example and not by way of limitation, flexible material lines 300 may comprise fishing line, such as ten-pound test monofilament line, for example, available for instance at Walmart stores. Alternatively, flexible material lines 300 may comprise, for example, dental floss or dental tape, such as traditional string floss, waxed or unwaxed, monofilament or multifilament. For example, flexible material lines 300 may comprise Nylon-waxed monofilament floss coated in polytetrafluoroethylene (PTFE). Flexible material lines 300 may be connected to first member 100 and third member 400 via any suitable technique, such as tying, nailing, riveting, screwing, over-molding, sonic welding, gluing, insertion into or through a hole with a knot on the other side, or any other suitable mechanical or chemical means, or any combinations thereof.

Figure 6:
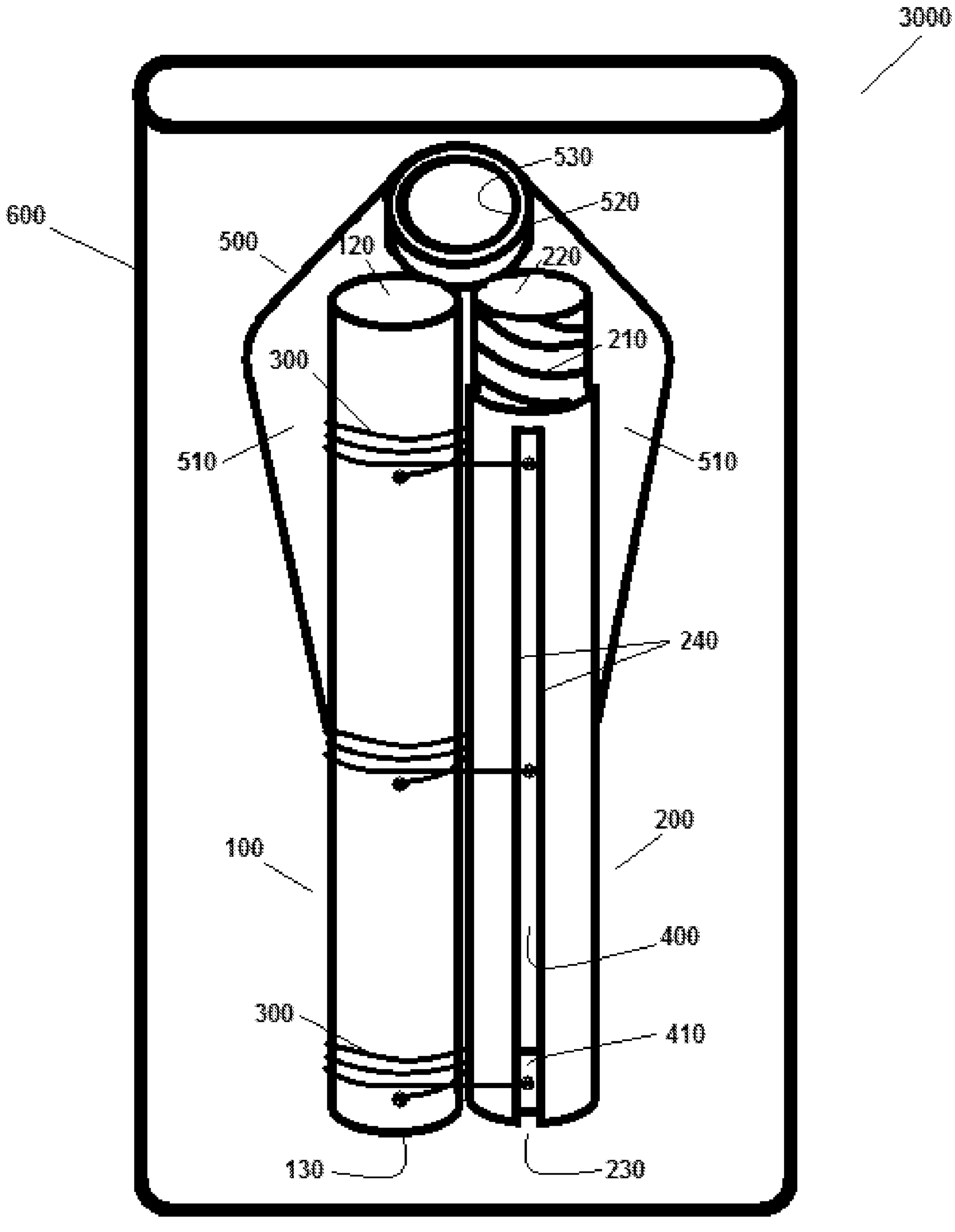
FIG. 6 is a front elevation perspective view of an example cake cutter and server apparatus and system according to various example embodiments, shown in an example compact package, and not necessarily to scale.

A plurality of flexible material lines 300 may connect the members as described herein, for instance three flexible material lines 300 as shown in the figures. Alternatively, any suitable number of flexible material lines 300 may be employed in a cutter system 1000, for instance two, four, five, six, seven, eight, nine, ten, or eleven, for example. In various example embodiments the flexible material lines 300 are connected to the first member 100 and to the third member 400 at equidistant spacing so that the members 100, 200 may be held so that the flexible material lines 300 are at least substantially parallel as shown in FIGS. 2, 4, and 7A-7D. For the same reason, in various example embodiments the flexible material lines 300 are at least substantially equal in length, so that when the members 100, 200 are held apart and approximately parallel to each other, for instance as shown in FIGS. 2, 4, and 7A-7D, the flexible material lines 300 are all pulled taut (pulled sufficiently tight to function as described herein) at the same time. Alternatively, regardless whether the flexible material lines 300 are actually substantially equal in total length, the cutter system 1000 may work as if they were the same length if the flexible material lines 300 are wound around the first member 100 (as shown in FIGS. 1 and 6) or around the second or third members 200, 400 (not shown), such that they can be simultaneously partially unwound by the same amount while maintaining all the flexible material lines 300 taut by urging apart the first and second members 100, 200. The total length of the flexible material lines 300 may be any suitable length appropriate for the intended use, such as one or two feet or more, or any other desired length. As noted in the description of the figures, the depictions in the figures are not necessarily to scale for any particular embodiment, and this is intentional to more clearly show pertinent features of various example embodiments.

Turning to a description of an example embodiment of the cutter system 1000, FIG. 1 shows an example cutter system 1000 assembled with the first and second members 100, 200, connected with a plurality of flexible material lines 300, where each flexible material line 300 is connected at one end to the first member 100 and connected at the other end to the third member 400 that is removably engaged at least partially inside the second member 200. The flexible material lines 300 extend from the third member 400, through the slot 240 in the second member 200, and are spooled or rolled-up around the first member 100 so that the first and second members 100, 200 are adjacent. FIG. 2 shows what happens to the example cutter system 1000 of FIG. 1 when the flexible material lines 300 are unspooled or unrolled from around the first member 100 so that the first and second members 100, 200 are separated by a cutting distance, and the flexible material lines 300 are all pulled taut (pulled sufficiently tight to function as described herein) at the same time. In this configuration the cutter system 1000 can be used to cut an item such as a cake 700 into pieces as depicted in FIGS. 7A-7D.

Figure 3:
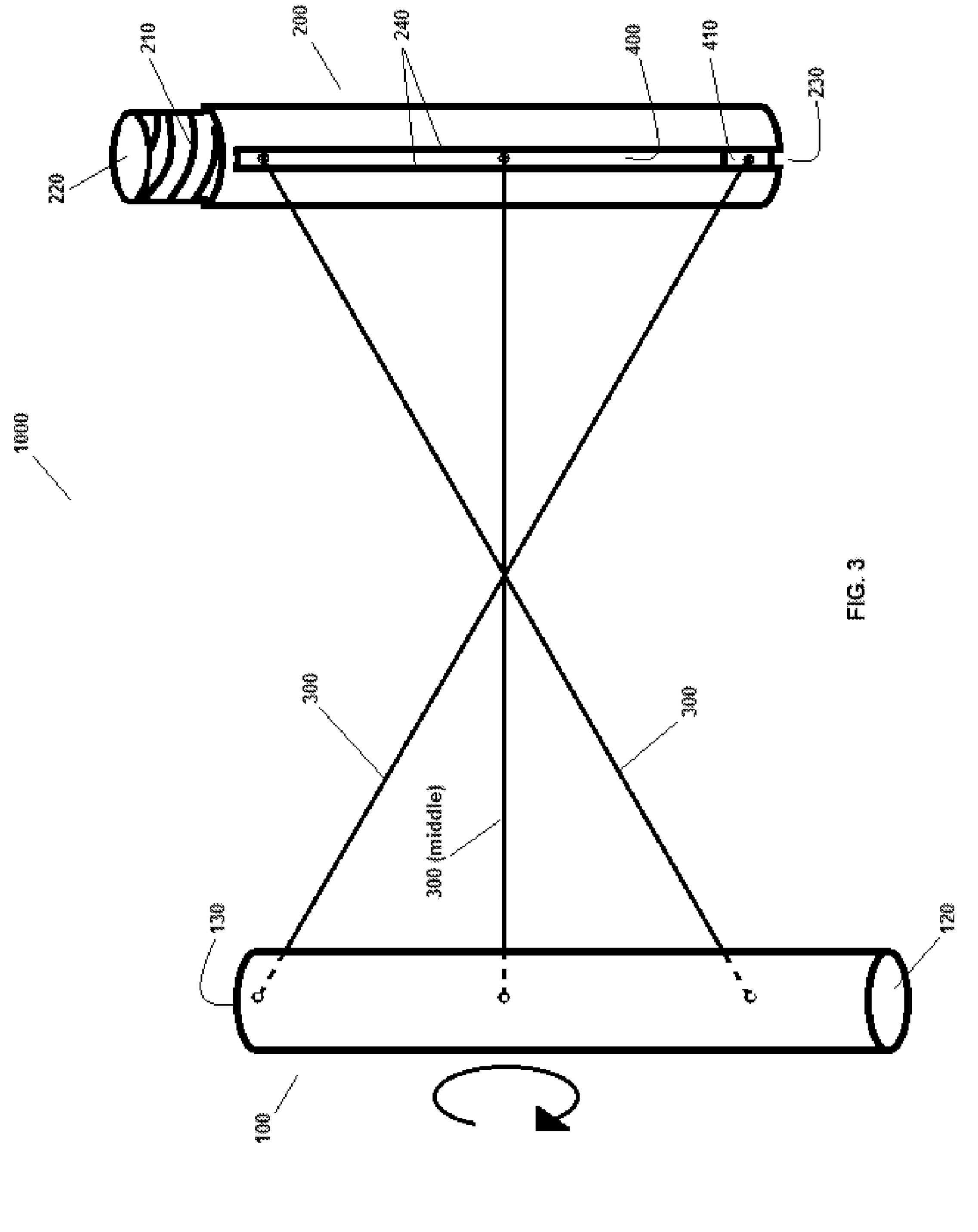
FIG. 3 is a front elevation perspective view of the example cake cutter apparatus and system of FIG. 2 in an expanded and twisted position, not necessarily to scale.
Figure 8A:
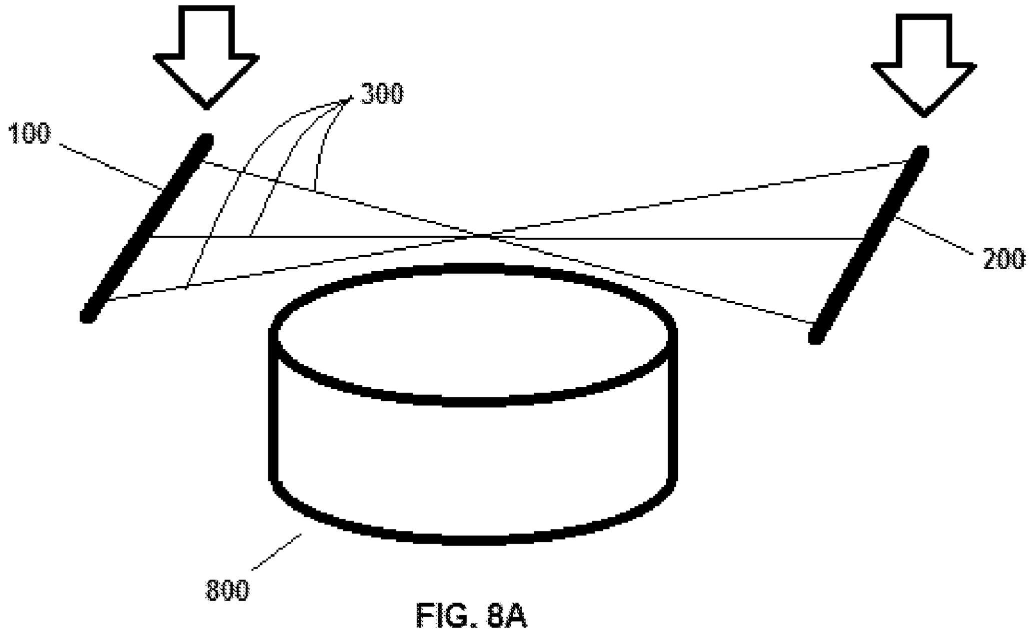
FIGS. 8A-8B are diagrams depicting steps of an example method of using the example cake cutter and server apparatus and system of FIG. 1, shown in isometric views cutting a round cake.
Figure 8B:
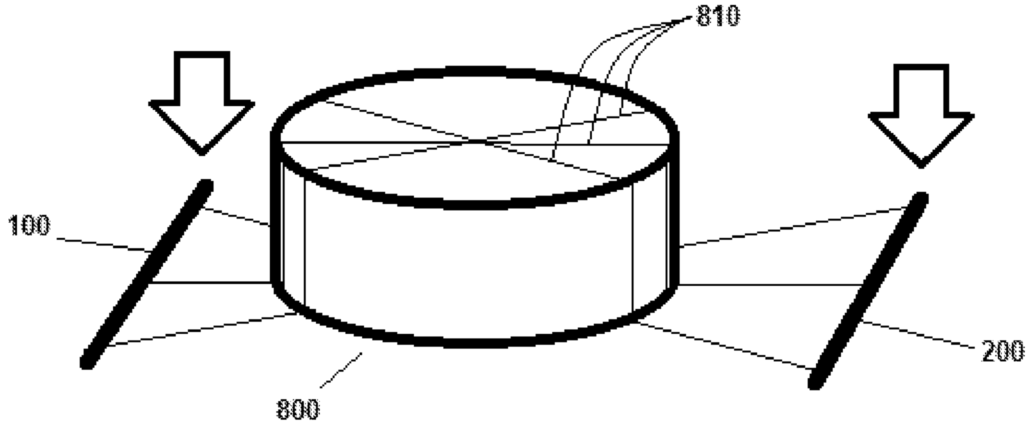

FIG. 3 shows an alternative way of using example cutter system 1000. Starting with the cutter system 1000 in the position shown in FIG. 2 as described herein, the first and second members 100, 200 may be rotated relative to each other by approximately 180 degrees about a central axis perpendicular the longitudinal axes of the longitudinally-extending first and second members 100, 200, e.g., the flexible material line designated "300 (middle)" in FIG. 3. By so rotating or twisting the first and second members 100, 200 of a cutter system 1000 having an odd number of equal-spaced flexible material lines 300, triangular cutting patterns may be formed as shown in FIG. 3, which may be used for cutting round items such as a round cake 800 as shown in FIGS. 8A, 8B. In this type of embodiment the flexible material line designated "300 (middle)" would typically lose some of its tautness, because twisting the first and second members 100, 200 as shown in FIG. 3 would typically bring the first and second members 100, 200 closer together (compared to when taut prior to twisting as shown in FIG. 2). However, the intersection of the flexible material lines 300 may tend to support the middle line 300 to still work sufficiently well. Alternatively, flexible material lines 300 may also be at least partially elastic, so that relative stretching of the lines 300 could make them all sufficiently taut in the position shown in FIG. 3.

FIG. 4 depicts removal of the second member 200 from the third member 400. This may be accomplished by disengaging the engagement mechanism 410 from the interior 250 of the second member 200, for instance by a user pulling the second member 200 off the third member 400. A handle or other structure (not shown) may be provided on or as part of the third member 400 that extends outside the body of the second member, for instance below the lower end 230 or above the upper end 220, to facilitate a user separating the second member 200 from the third member 400. The step shown in FIG. 4 would normally occur after the cutter system 1000 has been used to cut an item, for instance as shown in FIGS. 7A-8B.

FIGS. 5A and 5B depict an example server system 2000 that may be combined with or separate from the example cutter system 1000 described herein. For example and not by way of limitation, example server system 2000 can in various example embodiments use the second member 200, preferably after removal from the cutter system 1000 as depicted in FIG. 4 and described herein, as a handle for server system 2000. Specifically, in the non-limiting example shown in FIGS. 5A and 5B, attachment structure 210 of second member 200 may be adapted to engage (removably engage or non-removably engage) with a corresponding attachment structure 530 formed in a server blade structure 500. Attachment structure 530 may be any suitable structure, and may comprise for example any of the structures discussed herein for use as or with attachment structure 210. Attachment structure 530 may in various example embodiments comprise or by attached with an interface 520, such as a boss, hole, slot, protrusion, or any other suitable structure. Server blade structure 500 may comprise a blade 510 shaped and sized to balance a serving of pastry, such as a piece of pie or cake or the like, for example a wide, spade-like blade 510 as depicted in FIGS. 5A and 5B.

With continued reference to the example embodiment shown in FIGS. 5A and 5B, in various example embodiments server blade structure 500 may extend longitudinally several inches, for instance six, eight, ten, or twelve inches, or any other length suitable for a user to handle as described herein. In various example embodiments blade 510 may be the same or similar length as first member 100 or second member 200 or both, or may be longer. Server blade structure 500 may be formed from any suitable material(s), such as wood, plastic, glass, metal, composite material, or any other suitable material or any combination(s) thereof. For example, second member 200 may be formed from cottonwood, birch, spruce, or bamboo, for example. Alternatively, second member 200 may be formed from plastic, for example, such as a dishwasher-safe, FDA-approved thermoplastic (e.g. Acrylonitrile Butadiene Styrene (ABS)), Nylon, or glass fill. In various example embodiments second member 200 may be formed from the same materials) as first member 100 or second member 200 or both.

FIG. 6 depicts an example packaged cutter-server kit 3000 that in various example embodiments may comprise the elements of both cutter system 1000 and server system 2000 compactly assembled into a package 600 (shown transparent with visible edges). In various example embodiments, cutter-server kit 3000 may comprise the cutter system 1000 with the flexible material lines 300 coiled or wound around one or more of the members 100, 200, 400, with the first member 100 adjacent the second member 200, and both of them adjacent server blade structure 500, for instance on top of server blade structure 500, with interface 520 adjacent either upper ends 120, 200 or lower ends 130, 230 of cutter system 1000. Package 600 may encompass all or only part of cutter system 1000 and server system 2000. Package 600 may be formed from any suitable material, such as paper or plastic, such as clear flexible plastic, and may be openable via tearing or via a lid or opening. Package 600 may be formed as part of or attached with the interior or exterior of a container adapted to contain the item that the kit 3000 is adapted to cut and serve, a cake box being such a container, for example. In various example embodiments package 600 may be glued to the interior of a cake box and shipped or otherwise delivered to the end user along with the cake or other item to be cut inside the box. Alternatively, the package 600 may be simply placed inside the container along with the item that the kit is adapted to cut and serve, and delivered to the end user in that manner.

Figure 7A:
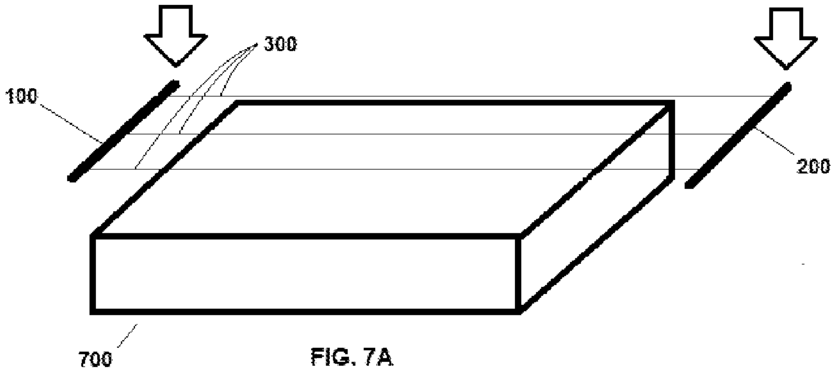
FIGS. 7A-7D are diagrams depicting steps of an example method of using the example cake cutter and server apparatus and system of FIG. 1, shown in isometric views cutting a rectangular cake.

The cutter system 1000, server system 2000, and cutter-server kit 3000 will now be described in use with particular reference to FIGS. 7A through 8B in addition to the other figures. Where a cutter-server kit 3000 is provided as shown in FIG. 6, a user may remove the cutter system 1000 and server system 2000 from the package 600, and open the cutter system 1000 from the position shown in FIG. 1 to the position shown in FIG. 2, such that first and second members 100, 200 pull taut a plurality of equal-spaced flexible material lines 300. The user may then position the cutter system 1000 above a food item to be cut, such as a cake 700, in a first position, for example as shown in FIG. 7A.

Figure 7B:
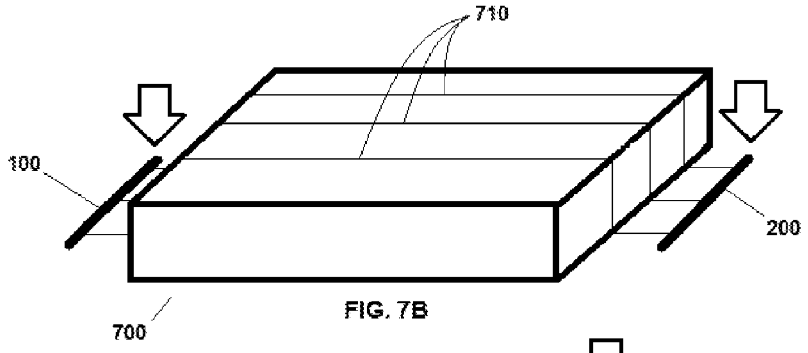
Figure 7C:
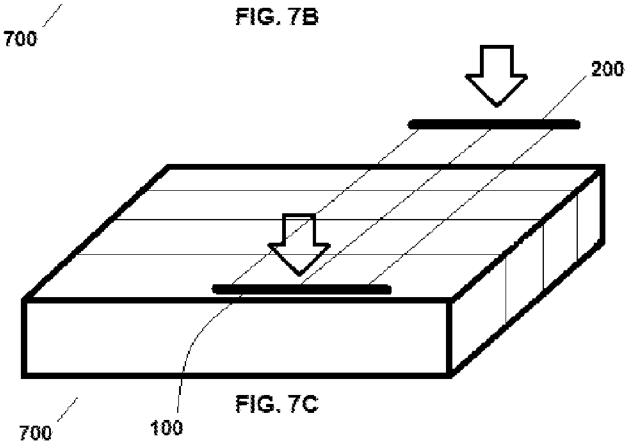
Figure 7D:
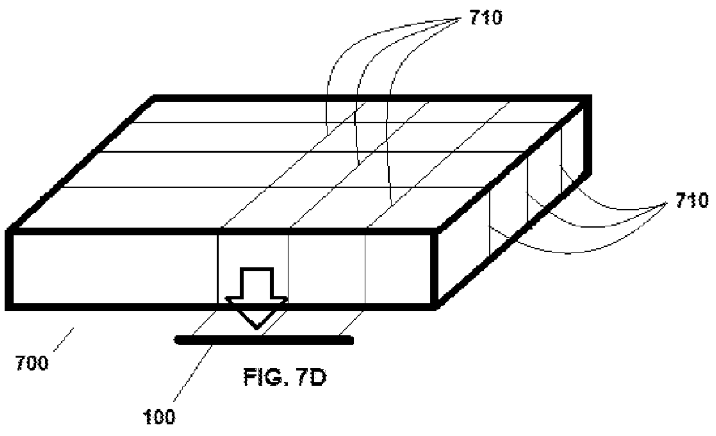

Then as depicted in FIG. 7B, the user (not shown) may apply force in the direction of the arrows and cause the cutter system 1000 to move downward toward the item 700, causing the plurality of equal-spaced flexible material lines 300 to cut corresponding lines or cuts 710 in a first direction in the item 700. It is notable that in various example embodiments the lines or cuts 710 may be extremely narrow so as to leave the appearance of the item 700 substantially undisturbed, which is desirable when serving a specially decorated cake, for instance. The user may then lift the cutter system 1000 back up through the lines or cuts 710 and re-position the cutter system 1000 above the item 700 in a second position, for instance in a position perpendicular to the first position, as shown in FIG. 7C. Then as depicted in FIG. 7D, the user (not shown) applies force in the direction of the arrows and causes the cutter system 1000 to move downward toward the cake 700, causing the plurality of equal-spaced flexible material lines 300 to cut corresponding lines or cuts 710 in a second direction in the cake 700, for instance perpendicular to the first direction. The above steps may be repeated as necessary or desired until the entire item 700 is cut into pieces.

Once the item 700 is cut into a desired number of pieces, in various example embodiments the user may disassemble the second member 200 from the third member 400 as depicted in FIG. 4 and described herein, and then join second member 200 with a server blade structure 500 to form a server system 2000 as depicted in FIGS. 5A and 5B and described herein. The user may then use the assembled server system 2000 by holding the handle 200 with their hand and sliding the blade 510 under a cut piece of the item 700 and lifting the cut piece up and removing it from the item 700 and serving it, for instance by placing it on a plate (not shown).

FIGS. 8A and 8B depict the same process as described above with respect to FIGS. 7A through 7D, except in the process shown in FIGS. 8A and 8B there is an additional step of twisting the first and second members 100, 200 relative to each other as shown in FIG. 3 and described herein, prior to making the cuts. This facilitates the creation of wedge or triangular-shaped cuts that may be preferable for a round item 800, such as a round cake or pie or the like, as shown in FIGS. 8A and 8B. Like the example embodiment described above with respect to FIGS. 7A through 7D, the steps depicted in FIGS. 8A and 8B may be repeated as necessary in various angular positions to create the desired number of cuts and sizes of resulting cut pieces.

Any or all of the cutter system 1000, server system 2000, and cutter-server kit 3000 may be formed from recyclable materials, and may after use be recycled or discarded or cleaned and stored for reuse in various example embodiments.

It is understood that the present invention is not limited to cake cutters or the cutting of cakes, unless specifically so claimed, but includes the words "cake" in the title for clarity of indexing the patent since it is expected that the cutting of cakes may be a primary use of the invention. However, the present invention may be used with any suitably soft foodstuff, including, without limitation, pastries such as pies and cakes and other pastry types, for example, all of which should be considered "cake" for purposes of this patent.

The embodiments described herein are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method of cutting a pastry having a thickness, comprising the steps of:

providing a cutter system capable of cutting a pastry into pieces without substantially disturbing the exterior appearance of the pastry, the cutter system comprising:

a first longitudinally-extending member extending from a first end to a second end;

a second longitudinally-extending member extending from a first end to a second end and having a body that is at least partially hollow and open on the second end, the second longitudinally-extending member comprising a longitudinally-extending slot forming a longitudinally-extending opening from an interior surface to an exterior surface of the second longitudinally-extending member the second longitudinally-extending member further comprising an attachment structure formed on the first end of second end of the second longitudinally-extending member;

a third longitudinally-extending member extending from a first end to a second end and removably affixed with the second longitudinally-extending member and inserted at least partially inside the hollow body of the second longitudinally-extending member;

a plurality of spaced-apart flexible material lines, with a first end of each of said flexible material lines connected to the first longitudinally-extending member and a second end of each of said flexible material lines connected to the third longitudinally-extending member so that a plurality of the flexible material lines pass through the longitudinally-extending slot in the second longitudinally-extending member; and a server blade structure comprising:

a blade shaped and sized to balance a serving of pastry; and an attachment structure configured to rigidly attach with the attachment structure formed on the first end or second end of the second longitudinally-extending member, so that the second longitudinally-extending member becomes a server blade handle when separated from the third longitudinally-extending member and attached to the attachment structure of the server blade;

urging the first longitudinally-extending member away from the second longitudinally-extending member until the plurality of equal-spaced flexible material lines are taut and the first longitudinally-extending member is separated from the second longitudinally-extending member by a distance equal to or greater than an outer dimension of the pastry;

positioning the cutter system above the pastry in a first position;

moving the cutter system downward against the pastry so that at least two of the plurality of flexible material lines form corresponding first cuts at least substantially all the way through the thickness of the pastry; and separating the second longitudinally-extending member from the third longitudinally-extending member; and attaching the attachment structure formed on the first end or second end of the second longitudinally-extending member to the attachment structure of the server blade.

2. The method of claim 1, further comprising the steps of:

sliding the blade under a cut piece of the pastry while holding the second longitudinally-extending member as a handle;

lifting-up the cut piece of the pastry with the blade and removing it from the pastry.

3. The method of claim 2, further comprising the steps of:

serving the cut piece of pastry by sliding the cut piece of pastry from the blade to a plate while holding the second longitudinally-extending member as a handle.

4. The method of claim 3, further comprising the step of:

recycling the cutter system.

* * * * *